United States Patent
Chan

(10) Patent No.: US 6,456,742 B1
(45) Date of Patent: Sep. 24, 2002

(54) METHOD FOR IMAGE PROCESSING

(75) Inventor: Kevin Chan, Taipei (TW)

(73) Assignee: Mustek Systems, Inc.

( * ) Notice: Subject to any disclaimer, the term of this patent is extended or adjusted under 35 U.S.C. 154(b) by 0 days.

(21) Appl. No.: 09/293,339

(22) Filed: Apr. 16, 1999

(51) Int. Cl.[7] ................................................ G06K 9/36
(52) U.S. Cl. ........................ 382/245; 382/232; 358/433
(58) Field of Search ................................. 382/245, 232; 358/426, 261.1, 261.2, 433

(56) References Cited

U.S. PATENT DOCUMENTS

| | | | |
|---|---|---|---|
| 4,791,622 A | * 12/1988 | Clay et al. ..................... | 369/59 |
| 5,537,551 A | * 7/1996 | Denenberg ............. | 395/200.18 |
| 5,740,358 A | * 4/1998 | Geklman ............... | 395/184.01 |
| 2001/0026585 A1 | * 10/2001 | Kumaki ................. | 375/240.01 |
| 2001/0043723 A1 | * 11/2001 | Kadota ....................... | 382/113 |

* cited by examiner

Primary Examiner—Jerome Grant, II

(57) ABSTRACT

An image compression/decompression method is provided to improve the speed of data processing after the AD converter outputting the data scanned. The present invention defines a byte as having an attribute code and a counter. Each image data is processed according to the bit planes from high bit to low bit. Every data access to the output data of the A/D converter can read $63(2^6-1)$ bytes. The attribute code of each byte represents the type of the encoded codes, such as high/low bit or un-encoded data. The counter, on the other hand, would count the number of consecutive bits having the same value. The encoded image data will be output to a RAM for the host computer to access. For decompression, the host computer will access the RAM. The host computer only need to request the attribute of the data byte to know if the encoded data is high/low bit or un-encoded data. Then, the host computer fills the same number of "1"s or "0"s into a buffer which can store 63 bits of data arranged in the same order as the previously defined blocks according to their attributes. After the buffer is full, the entire data of the buffer will be output to the host computer for further processing.

12 Claims, 3 Drawing Sheets

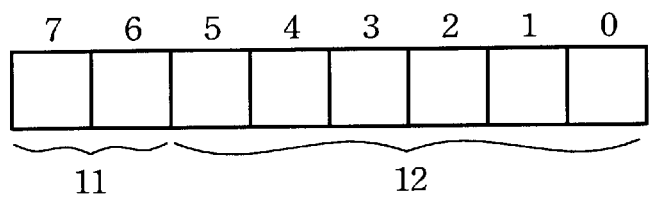
Fig.1A
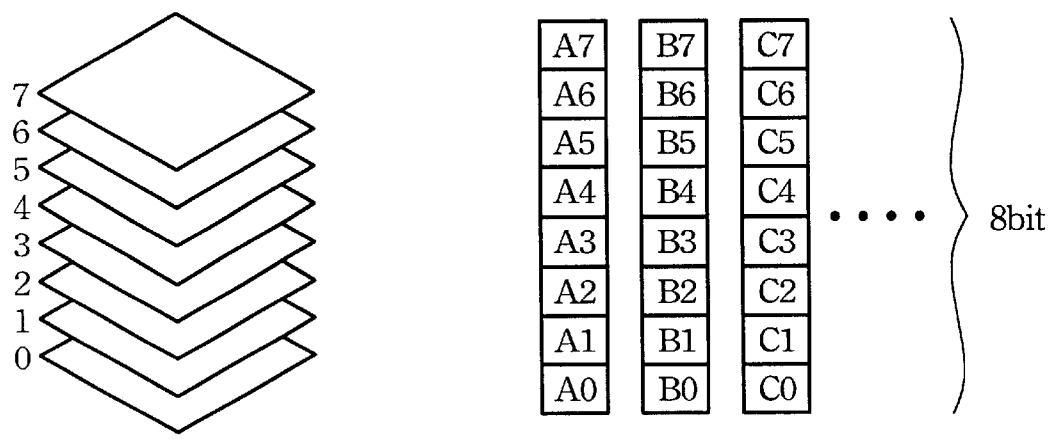
Fig.1B
Fig.2A
(Prior Art)
Fig.2B
(Prior Art)

METHOD FOR IMAGE PROCESSING

BACKGROUND OF THE INVENTION

A. Field of the Invention

The present invention relates to a method for image processing, especially to an image compression/decompression method which is bit-based and adaptable to an A/D converter of 12-bit, 14-bit or even more bits.

B. Description of the Prior Art

The primary object of image compression/decompression is to increase the speed of image transmission when communicating between hardware or software. The technology of image compression/decompression for a scanner is especially for increasing the transmission speed between a host computer and a scanner. The scanned image will be converted into digital data by an Analog/Digital converter (A/D converter) for data processing. These digital data are usually compressed before they are sent to the host computer. The compressed data will then be sent to a Random Access Memory (RAM) for the host computer to access. The host computer will then decompress the data read from the RAM and show the restored image on the screen for the user to view or for further processes.

Since an A/D converter of 8-bit is most commonly used in a scanner, conventional reading and processing procedures are based on a unit of 8-bit. Data compression/decompression is also based on the characteristics of the 8-bit data. In other words, for each time when compressing the image data, 8 bits of data can be compressed at the most. The situation is the same for decompression. As the technology of A/D converter has been improved, an A/D converter of 12-bit, 14-bit or even more bits have already been available on the market. Consequently, the conventional image compression/decompression method will not be applicable to such non-8-bit A/D converters. Moreover, when using 8-bit as a processing unit, mosaic effects are often occurred when the fidelity of a decompressed image cannot be fully restored. Furthermore, reading and processing image data of 8-bit a time is apparently not efficient enough because the data size is too small. Such small data sample will also mean low ratio of data repetition.

SUMMARY OF THE INVENTION

Accordingly, it is an object of the present invention to provide a method for image compression/decompression which will not generate mosaic effects on the images after the image is decompressed, and which can increase the ratio of data repetition, thereby to improve the speed of image processing.

It is another object of the present invention to provide a method for image compression/decompression which will not be restricted by the bit number of an A/D converter, and adaptable to A/D converters of 12-bit, 14-bit or even more bits.

In accordance with the invention, a new method for data compression and decompression is provided for processing data output of an A/D converter of a scanner. The present invention predetermines the data format for each encoded byte which comprises an attribute field of 2 bits, and a counter field of 6 bits. The attribute field of each encoded byte represents the type of the bits compressed. Since a bit is either 1 or 0, so the attribute field of an encoded byte is enough for distinguishing the bit types. Since the counter field is 6-bit, an encoded byte can record 63 ($2^6-1$) consecutive high bits/low bits in the counter field at the most.

The encoded image data will be output to a RAM for the host computer to access. On the other hand, for image decompression, the host computer will access the RAM. With the predetermined data format, the host computer only need to request the attribute field of each encoded byte to know if the encoded data is a high bit or a low bit or unencoded data. Then, the host computer fills the same number of "1"s or "0"s into a buffer which can store 63 bytes of data arranged in the same order as the previously defined image blocks. After the buffer is full, the entire data of the buffer will be output to the host computer for further processing.

BRIEF DESCRIPTION OF THE DRAWINGS

These and other objects and advantages of the present invention will become apparent by reference to the following description and accompanying drawings wherein:

FIG. 1A is a schematic diagram illustrating the data format of an encoded byte according to the present invention.

FIG. 1B is a table showing the definitions for the possible combinations of the bits in the attribute field of an encoded byte.

FIG. 2A is a schematic diagram showing the bit planes of a conventional image processing technique.

FIG. 2B is another schematic diagram showing the bit planes of a conventional image processing technique.

DETAILED DESCRIPTION OF THE PREFERRED EMBODIMENTS

Figure 3:
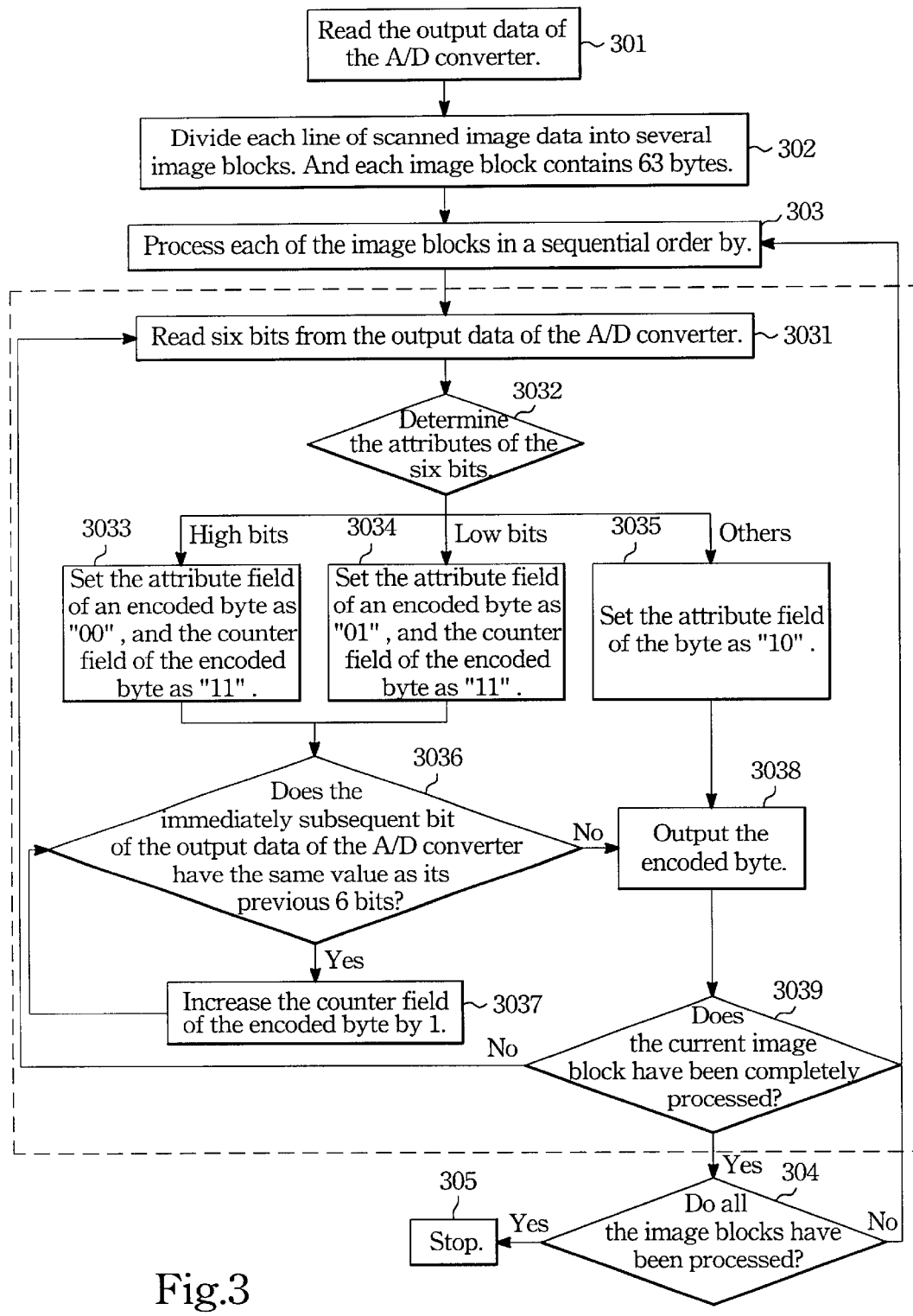
FIG. 3 is a flowchart showing the compression procedure of the present invention.
Figure 4:
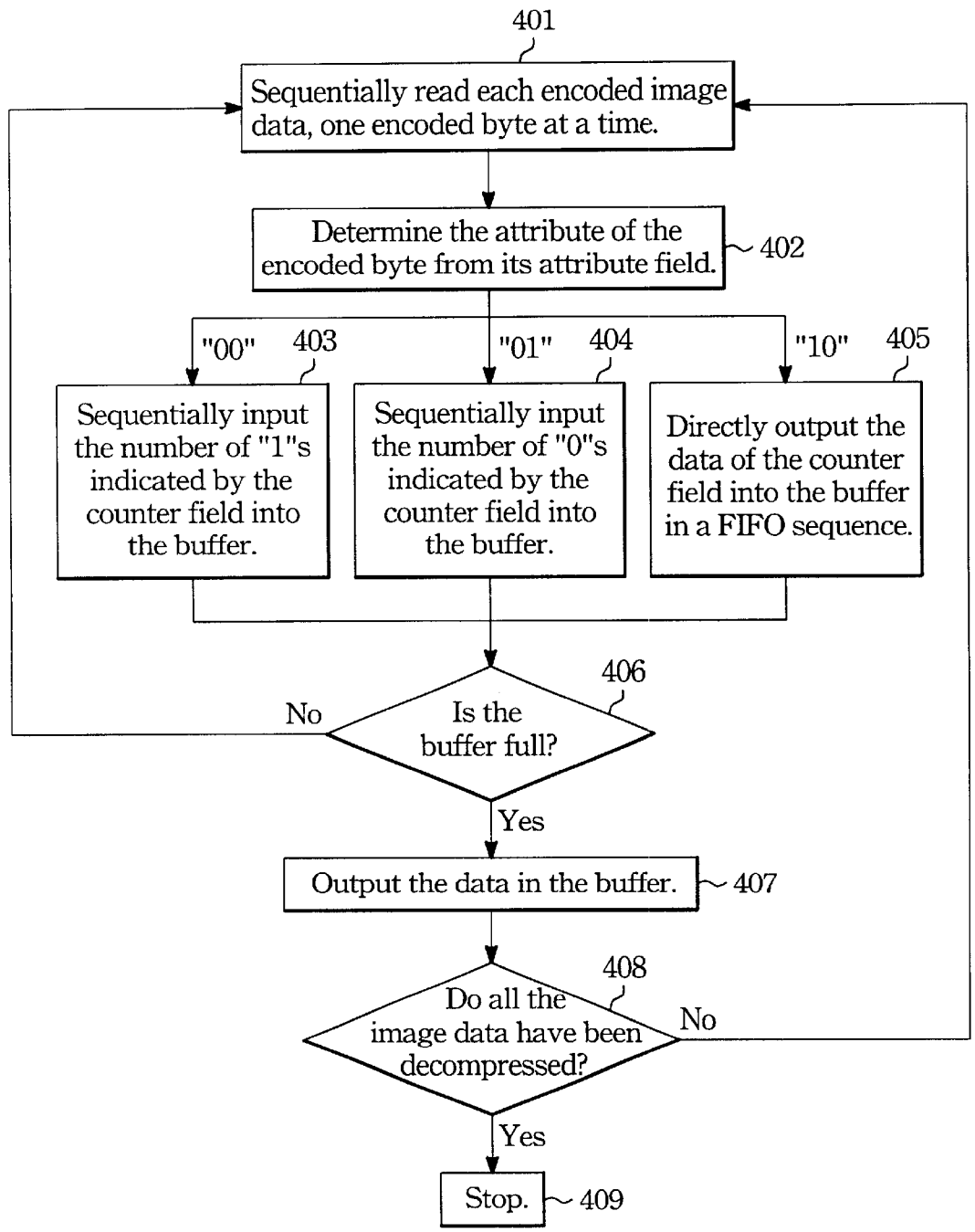
FIG. 4 is a flowchart showing the decompression procedure of the present invention.

To provide a new method for image compression/decompression adaptable for new generations of A/D converters, the present invention provides a method which is simple, efficient and independent of the bit-number of the A/D converters. Accordingly, the present invention first defines the data format of an encoded byte. Refer to FIG. 1A, each encoded byte has an attribute field 11, which is 2-bit, and a counter field 12, which is 6-bit. The 2-bit attribute field 11 can represent 4 kinds of attributes. As illustrated in FIG. 1B, "00" means that the compressed data are n number of continuous "1"s, where n is equal to the number recorded in the counter field 12. And, "01" means that the compressed data are n number of continuous "0"s, where n is equal to the number recorded in the counter field 12. And "10" means that the data is not compressed. In other words, the data in the counter field 12 are not encoded and can be read directly by the host computer. For instance, when the data repetition is extremely low, the compression rate will be very low. In such case, the image data does not need to be compressed and can be directly output to the host computer. And finally, "11" is undefined yet and can leave for later application. The definition for the bit combinations in the attribute field can be arbitrarily defined only if they can fully represent these four cases.

Each encoded data is processed as an encoded byte (8-bit). In addition to the 2-bit of the attribute field, the remaining 6 bits can be used as a counter for recording the number of consecutive bits having the same value. Thus, the 6-bit can record 63 ($2^6-1$) bits of data at the most. For instance, "00111111" represents the image data has 63 consecutive high bits ("1"s). On the other hand, "01001111" will represent the scanned image has 30 consecutive "0"s.

The present invention also adopts the concept of bit planes for image compression/decompression. According to the concept of bit planes, each pixel of an image may be represented by 8 bits. Thus, an image can be viewed as being constituted by 8 one-bit planes as illustrated in FIG. 2A ranging from the least significant bit plane 0 to the most significant bit plane 7. The bit plane 0 is constituted by each lowest bit of each pixel while the bit plane 7 by each highest bit of each pixel. When processing an image, each pixel of the image will be processed according to its bit planes. As illustrated in FIG. 2B, each bit of the bit plane will be processed individually from the highest bit to the lowest bit. In other words, the image will be processed in the following order: [A7][B7][C7] . . . [A6][B6][C6] . . . [A5][B5][C5] . . . [A4][B4][C4] . . . [A3][B3][C3] . . . [A2][B2][C2] . . . [A1][B1][C1] . . . [A0][B0][C0] . . . .

According to the bit planes, an image will look differently if they are illustrated based on different bit planes. The compression ratio of high bit plane is higher than the low bit plane because its data repetition is higher. Since the compression ratio of the lowest three bit planes is very low, the image data can be directly transmitted to the host computer without compression. These data can also be ignored at the compression stage but be made up later at the decompression stage by randomly adding low bits of a pixel into the decompressed image to improve the fidelity of the image or by many other ways well known to the art.

According to the method described above, the present invention read 63 bits each time at the most, since the counter is 6 bits which can record 63 encoded data and each encoded data is processed by bit planes. Therefore, the size for each image block will be 63 bytes.

The compression procedure of the present invention is illustrated in FIG. 3.

301: Read the output data of the A/D converter.
302: Divide each line of scanned image data into several image blocks. And each image block contains 63 bytes.
303: Process each of the image blocks in a sequential order and according to the following rules:
3031: Read six bits from the output data of the A/D converter.
3032: Determine the attributes of the 6 bits. If these 6 bits are all "1"s, execute step 3033. If these 6 bits are all "0"s, execute step 3034. For other cases, execute step 3035.
3033: Set the attribute field of an encoded byte as "00", and the counter field of the byte as "11", and go to step 3036.
3034: Set the attribute field of the encoded byte as "01", and the counter field of the byte as "11", and go to step 3036.
3035: Set the attribute field of the encoded byte as "10", and go to step 3038.
3036: Determine if the immediately subsequent bit of the output data of the A/D converter has the same value as its previous 6 bits? If yes, go to step 3037. If not, go to step 3038.
3037: Increase the counter field by 1, and repeat the step of 3036.
3038: Output the byte to a memory device.
3039: Determine if the image block has been completely processed? If yes, go to step 304. If not, go to step 3031.
304: Determine if all the image blocks have been processed? If yes, go to step 305. If not, go to step 303.
305: Stop.

At step 3031, to increase the compression ratio of the image data, the binary codes can be converted into gray code first. The gray code is generated by executing XOR operation on the neighboring bits of a bit. When converting into gray codes, even a small change in the gray levels can be shown clearly on all the bit planes. Consequently, each bit plane will be more informative and will not show a large image block of completely black or white.

The compressed data will be stored in a Random Access Memory (RAM) to be processed by a host computer. The host computer will then decompress the encoded bytes according to the compression scenario. Additionally, a buffer of 63 bytes at least is required for storing the decompressed image data. The memory allocation for the buffer is the same as the memory for storing the image blocks before they are compressed. The method of decompression is explained below:

401: Sequentially read each encoded image data, one encoded byte at a time.
402: Determine the attribute of the encoded byte from its attribute field.
403: When the attribute field of the encoded byte is "00", sequentially input the number of "1"s indicated by the counter field into the corresponding locations of the memory. That is, according to the order of [A7][B7][C7] . . . [A6][B6][C6] . . . [A0][B0][C0] . . . , from the highest bit to the lowest bit.
404: When the attribute field of the encoded byte is "01", sequentially input the number of "1"s indicated by the counter field into the corresponding locations of the buffer. That is, in an order of [A7][B7][C7] . . . [A6][B6][C6] . . . [A0][B0][C0] . . . , from the highest bit to the lowest bit.
405: When the attribute field of the encoded byte is "10", directly output the data of the counter field into the correspondent locations in the buffer in a FIFO order. Since the data is not compressed, so the data stored in the counter is the raw data. Thus, no decompression is required in such case. For instance, if the encoded byte is "10101010", and representing the data of the $5^{th}$ bit plane, then the data of "101010" will be filled into [A5][B5][C5][D5][E5][F5].
406: Determine if the buffer is full? If yes, go to step 407. If not, go to step 401.
407: Output the data in the buffer.
408: Determine if all the image data have been decompressed? If yes, go to step 409. If not, go to step 401.
409: Stop.

Thus, whenever an image block is decompressed, the data in the buffer will be sent to the host computer till each image block has been completely processed. If the original binary codes have been converted into gray codes, the gray codes must be converted back to binary codes before they are sent to the buffer at step 407. The process of data compression and decompression can be executed at the same time based on using 63 bytes as a processing unit. Whenever the compression program transmits the encoded 63 bytes into the memory device, the decompression program can begin the process of decompression. Since the decompression is based on 63 bytes as a unit, the decompression will not start until the previous 63 bytes have been completely encoded.

The present invention can be implemented by software or hardware. The hardware implementation is usually in a form of an ASIC. The software will then be executable by a host computer. To sum up, the present invention is bit-based so that the compression and decompression procedures are independent of the bit number of an A/D converter. Beside, since the quantity of data processed each time is increased, so the ratio of data repetition is also higher than the above mentioned conventional method. Consequently, the present inventive method is faster and more efficient.

In addition, the proposed compression/decompression method can solve the problem of image loss because it can especially deal with a single bit for special processes. For instance, it can reduce the gray levels of a pixel from 255 to 128 or 64 so as to make the pixel look more smoothly without generating mosaic effects. Moreover, depending on the image size, the inventive method is very flexible in image transmission. The inventive method allows various ways of image transmission, such as low bit transmission, line sample transmission. The compressed image can even be reestablished by duty cycle.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A method for processing a plurality of digital image data from an analog/digital converter of an image information reading apparatus, comprising the steps of:

predetermining a data format for an encoded byte, said encoded byte comprising an attribute field, and a counter field;

logically dividing said plurality of digital image data into a plurality of image blocks;

processing each of said plurality of image blocks in a sequential order by following the steps of:

(a) reading a bit stream from said plurality of digital image data;

(b) recording an attribute of said bit stream in an attribute field of an encoded byte for said bit stream;

(c) setting a binary "11" in a counter field of said encoded byte for said bit stream when said attribute of said encoded byte representing a high bit or a low bit, and executing a step of (e);

(d) sequentially reading a bit stream from said plurality of digital image data into said counter field of said encoded byte for said bit stream when said attribute of said encoded byte is not a high bit nor a low bit;

(e) continuously counting the number of bits having the same value of said bit stream from said plurality of digital image data until said counter field of said encoded byte is all "1"s or until encountering a bit having an opposite value of said bit stream;

(f) outputting said encoded byte when said counter is all "1"s or when encountering a bit having an opposite value of said bit stream; and (g) repeating said step (a) to said step (f) until said plurality of digital image data has been completely encoded.

2. The method as claimed in claim 1, further comprising the steps of:

sequentially reading each encoded byte of said plurality of image data;

determining an attribute of each encoded byte according to its attribute field;

sequentially storing the same number of "1"s indicated by said counter field of each encoded byte into the corresponding locations of memory means when an attribute field of an encoded byte indicates a high bit;

sequentially storing the same number of "0"s indicated by a counter field of each encoded byte into the corresponding locations of said memory means when said attribute field of an encoded byte indicates a low bit;

sequentially storing a plurality of binary data of a counter field of each encoded byte into the corresponding locations of said memory means when an attribute field of an encoded byte indicates neither a high bit nor a low bit; and outputting each data in said memory means when said memory means is full.

3. The method as claimed in claim 2, wherein said memory means comprises at least 63 bytes.

4. The method as claimed in claim 1, wherein said step (a) further comprising the step of:

(h) converting said bit stream into gray codes when reading said bit stream from said plurality of digital image data.

5. The method as claimed in claim 4, further comprising the step of:

converting said gray codes back into binary codes before outputting each of said data in said memory means.

6. The method as claimed in claim 1, wherein said attribute field is two bits, said counter field is 6 bits, and said bit stream is 6 bits.

7. A method for processing a plurality of digital image data from an analog/digital converter of an image information reading apparatus, comprising the steps of:

(a) predetermining a data format for an encoded byte, said encoded byte comprising an attribute field, and a counter field;

(b) logically dividing said plurality of digital image data into a plurality of image blocks;

(c) sequentially reading a bit stream from said plurality of digital image data;

(d) recording an attribute of said bit stream in an attribute field of an encoded byte for said bit stream;

(e) setting a binary "11" in a counter field of said encoded byte for said bit stream when said attribute of said encoded byte representing a high bit or low bit, and continuously increasing said number in said counter field by counting the number of bits having the same value of said bit stream until said counter field of said encoded byte is all "1"s or until encountering a bit having an opposite value of said bit stream;

(f) sequentially reading a bit stream from said plurality of digital image data into said counter field of said encoded byte for said bit stream when said attribute of said encoded byte is not a high bit nor a low bit;

(g) outputting said encoded byte when said counter is all "1"s or when encountering a bit having an opposite value of said bit stream;

(h) repeating said step (c) to said step (g) until said plurality of digital image data has been completely encoded;

(i) sequentially reading each encoded byte of said plurality of image data;

(j) determining said attribute of each encoded byte according to its attribute field;

(k) sequentially storing the same number of "1"s indicated by said counter field of each encoded byte into the corresponding locations of memory means when an attribute field of an encoded byte indicates a high bit;

(l) sequentially storing the same number of "0"s indicated by a counter field of each encoded byte into the corresponding locations of said memory means when said attribute field of an encoded byte indicates a low bit;

(m) sequentially storing a plurality of binary data of data of a counter field of each encoded byte into the corresponding locations of said memory means when said attribute field of an encoded byte indicates neither a high bit nor a low bit; and (n) outputting each data in said memory means when said memory means is full.

8. The method as claimed in claim 7, wherein said step (b) further comprising step of:

(o) converting said bit stream into gray codes when reading said bit stream from said plurality of digital image data.

9. The method as claimed in said claim 8, wherein said step (o) further comprising the step of:

(p) converting said gray codes back into binary codes before outputting each of said data in said memory means.

10. The method as claim in claim 7, wherein said attribute field is two bits, said counter field is 6 bits, and said bit stream is 6 bits.

11. The method as claimed in claim 7, wherein said memory means comprises at least 63 bytes.

12. The method as claimed in claim 7, wherein said step (c) to said step (h) and said step (i) to said step (n) can be executed at the same time.

* * * * *